US006889936B1

(12) United States Patent
Pho et al.

(10) Patent No.: US 6,889,936 B1
(45) Date of Patent: May 10, 2005

(54) APPARATUS AND METHODS FOR INCREASING USEABLE SPACE WITHIN AIRCRAFT LAVATORIES

(75) Inventors: Hau T. Pho, Seattle, WA (US); Shawn A. Claflin, Lake Stevens, WA (US); Robert J. Bengtsson, Mukilteo, WA (US); Joel J. Peterson, Snohomish, WA (US); Stephen H. Pickard, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/715,309

(22) Filed: Nov. 17, 2003

(51) Int. Cl.⁷ .............................................. B64D 11/02
(52) U.S. Cl. ..................... 244/118.5; 4/312; 105/315
(58) Field of Search ..................... 244/118.1, 118.5; 4/638, 644, 312, 627; 105/315, 344; 49/40

(56) References Cited

U.S. PATENT DOCUMENTS

| | | | | |
|---|---|---|---|---|
| 1,789,899 A | * | 1/1931 | Guinness | 4/644 |
| 2,142,396 A | * | 1/1939 | Humphries | 52/32 |
| 2,443,214 A | * | 6/1948 | Williams | 4/312 |
| 2,546,133 A | * | 3/1951 | Patton | 105/315 |
| 2,582,002 A | * | 1/1952 | Candlin, Jr. | 105/344 |
| 3,719,959 A | * | 3/1973 | Ekstrom | 4/638 |
| 4,475,465 A | * | 10/1984 | Hastings | 109/2 |
| 5,605,014 A | * | 2/1997 | Kimura | 49/40 |
| 6,079,669 A | | 6/2000 | Hanay et al. | |

FOREIGN PATENT DOCUMENTS

WO     WO 96/11124     4/1996

* cited by examiner

*Primary Examiner*—Galen Barefoot
(74) *Attorney, Agent, or Firm*—Harness Dickey & Pierce P.L.C.

(57) ABSTRACT

Apparatus and methods for increasing useable space within a mobile platform compartment, such as an aircraft lavatory, which is adjacent a predetermined area, such as a passenger doorway area, of the mobile platform. The apparatus generally includes a turntable module rotatably coupled to supporting structure within the mobile platform. The turntable module can be rotated to a first angular position in which the turntable module is substantially within the compartment but outside the predetermined area. The turntable module can also be rotated to a second angular position in which the turntable module is substantially within the predetermined area but outside the compartment. The turntable module supports at least one item, such as a lavatory sink, which is accessible from within the compartment when the turntable module is in the second angular position.

27 Claims, 20 Drawing Sheets

TO GRAYWATER SUBSYSTEM

APPARATUS AND METHODS FOR INCREASING USEABLE SPACE WITHIN AIRCRAFT LAVATORIES

FIELD

The present invention relates generally to mobile platforms, and more particularly (but not exclusively) to apparatus and methods for increasing useable space within aircraft lavatories.

BACKGROUND

Airlines are continually striving to meet passenger demand for improved lavatory comforts including demands for more room for changing clothes, changing diapers, and refreshing themselves within lavatories. It is this customer demand that is driving airlines to increase the size of lavatories while competing with other airlines to attract customers.

However, increasing lavatory footprints normally decreases available revenue generating space on the aircraft. For at least this reason, airlines are asking manufacturers to improve lavatory features and comforts without decreasing revenue generating space.

SUMMARY

The present invention relates to apparatus and methods for increasing useable space within a mobile platform compartment, such as an aircraft lavatory, which is adjacent a predetermined area of the mobile platform, such as an aircraft passenger doorway area. The apparatus generally includes a turntable module rotatably coupled to supporting structure within the mobile platform. The turntable module can be rotated to a first angular position in which the turntable module is substantially within the compartment but outside the predetermined area. The turntable module can also be rotated to a second angular position in which the turntable module is substantially within the predetermined area but outside the compartment. The turntable module supports at least one item, such as a lavatory sink, which is accessible from within the compartment when the turntable module is in the second angular position.

In another form, the invention provides methods for increasing useable space within a mobile platform compartment, such as an aircraft lavatory, adjacent a predetermined area of the mobile platform, such as an aircraft passenger doorway area. The method generally includes rotatably coupling a turntable module to supporting structure within the mobile platform such that the turntable module is rotatable to a first angular position in which the turntable module is substantially within the compartment and outside the predetermined area and to a second angular position in which the turntable module is substantially within the predetermined area and outside the compartment; and supporting at least one item with the turntable module such that the item is accessible from within the compartment when the turntable module is in the second angular position.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of the preferred embodiments is merely exemplary in nature and is in no way intended to limit the invention, its application, or uses.

According to one aspect, the invention provides an apparatus for increasing useable space within a mobile platform compartment (e.g., lavatory, galley, etc.) adjacent a predetermined area of the mobile platform. In one embodiment, the apparatus generally includes a turntable module rotatably coupled to supporting structure within the mobile platform. The turntable module can be rotated to a first angular position in which the turntable module is substantially within the compartment but outside the predetermined area. The turntable module can also be rotated to a second angular position in which the turntable module is substantially within the predetermined area but outside the compartment. The turntable module supports at least one item (e.g., sink, appliance, etc.) which is accessible from within the compartment when the turntable module is in the second angular position.

When used onboard an aircraft, the turntable module can be rotated into an aircraft's emergency doorway space during cruise to increase the useable space of an aircraft compartment, such as a lavatory. The Federal Aviation Administration requires emergency doorway spaces to be clear of obstruction during taxi, takeoff, and landing phases of the aircraft for the emergency exit and attendant assist purposes. However, while the aircraft is cruising, the emergency doorway spaces can be intruded as long as the intrusion is non-permanent, such as is the case for the turntable module. Further, the emergency doorway spaces are largely unused during cruise and are normally used only for entry and departure from the aircraft while on the ground. Typically, the emergency doorway spaces (i.e., aisle width) are parallel to the doorway and have dimensions dependent upon the type of doorway.

Figure 1:
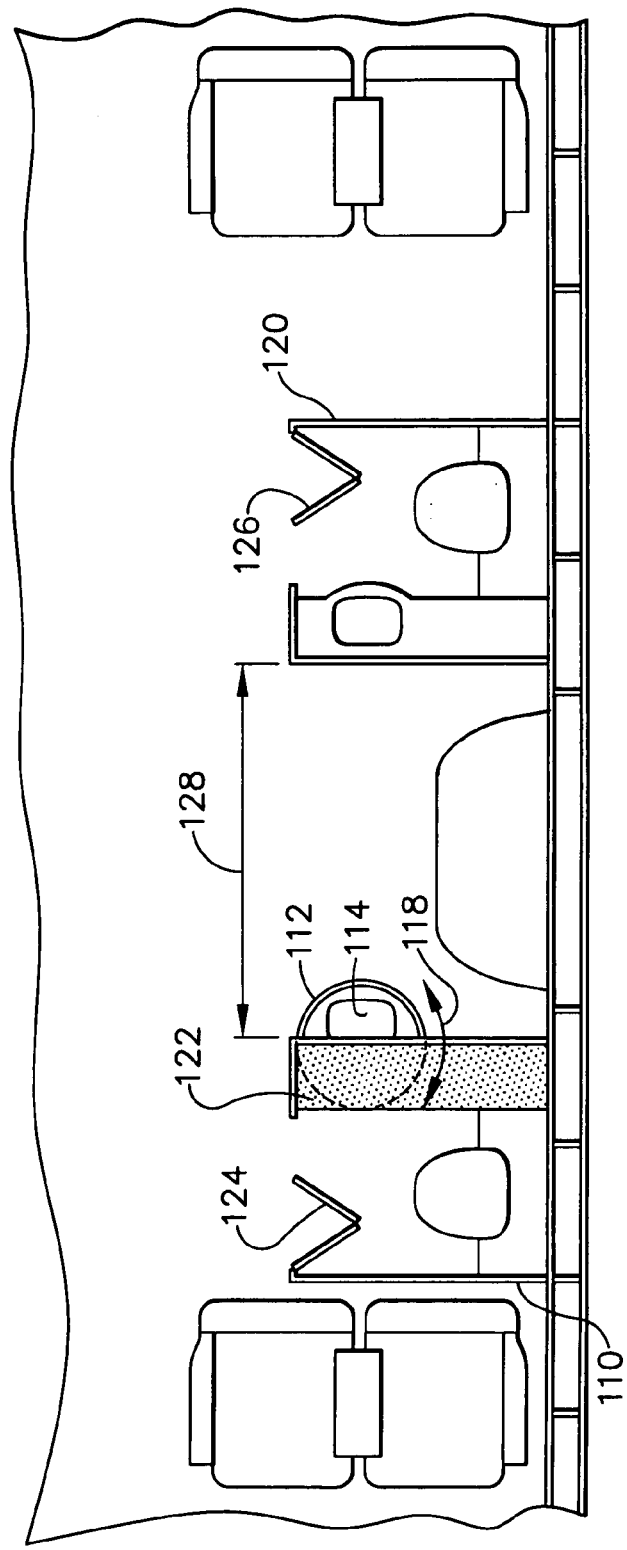
FIG. 1 is a partial schematic plan view of an aircraft interior illustrating a doorway entry, a conventional lavatory (on the right), and a lavatory (on the left) including a turntable module shown in a "lavatory-in-use" configuration according to one embodiment of invention.

FIG. 1 illustrates an exemplary embodiment of an aircraft lavatory 110 (on the left) embodying at least some aspects of the invention. As shown, the lavatory 110 includes a turntable module 112 which is shown in a "lavatory-in-use" configuration wherein the sink 114, supported by the turntable module 112, is accessible from within the lavatory 110. As represented by the arrows 118, the turntable module 110 is rotatable to other angular positions.

FIG. 1 also illustrates a conventional lavatory 120 (on the right) for comparison with the lavatory 110. The shaded portion 122 represents additional footprint area or increased useable volume space that can be achieved by implementing the turntable module 112 in the lavatory 110 and without a loss of revenue generating space.

Both lavatories 110 and 120 include conventional doors 124 and 126, respectively, for entry therein and are disposed adjacent a doorway entry area 128 of the aircraft. As used herein, the terms outboard, inboard, fore and aft have the meanings ordinarily attributed to these words in an aircraft.

FIGS. 2 through 8 illustrate an exemplary lavatory 210 embodying at least some aspects of the invention. The lavatory 210 includes a stationary subassembly 230 and a turntable module 212 rotatable relative to the subassembly 230.

The fixed subassembly 230 includes four sidewalls 232, 234, 236, and 238. The subassembly 230 also includes a floor pan 240 and a ceiling (not shown). A toilet 242 is affixed to the floor pan 240. The wall 234 can include an opening 243 for receiving an amenities console above the toilet 242. The amenities console may contain toilet seat covers, facial tissues, air sick bags, sanitary napkins, among other things.

The stationary subassembly 230 is essentially a box-shaped structure configured to coincide with an interior contour of the aircraft in which the lavatory 210 will be installed. The dimensions of the lavatory 210 can vary and will depend, at least in part, on the particular aircraft in which the lavatory and turntable module will be employed.

The fixed subassembly 230 is attached to suitable aircraft structure (not shown) adjacent a doorway entry or aisle. It will be appreciated that the subassembly 230 and thus the lavatory 210 may be repositioned in a direction opposite to that shown.

In the illustrated embodiment, the turntable module 212 includes a semi-circular rotational cylinder. The turntable module 212 supports a sink 214 and accommodates at least a portion of a plumbing system (described below and shown in FIGS. 12, 19 and 20) in communication with the sink 214. Each of these components are preferably located within the envelope of the turntable module 212.

Figure 3A:
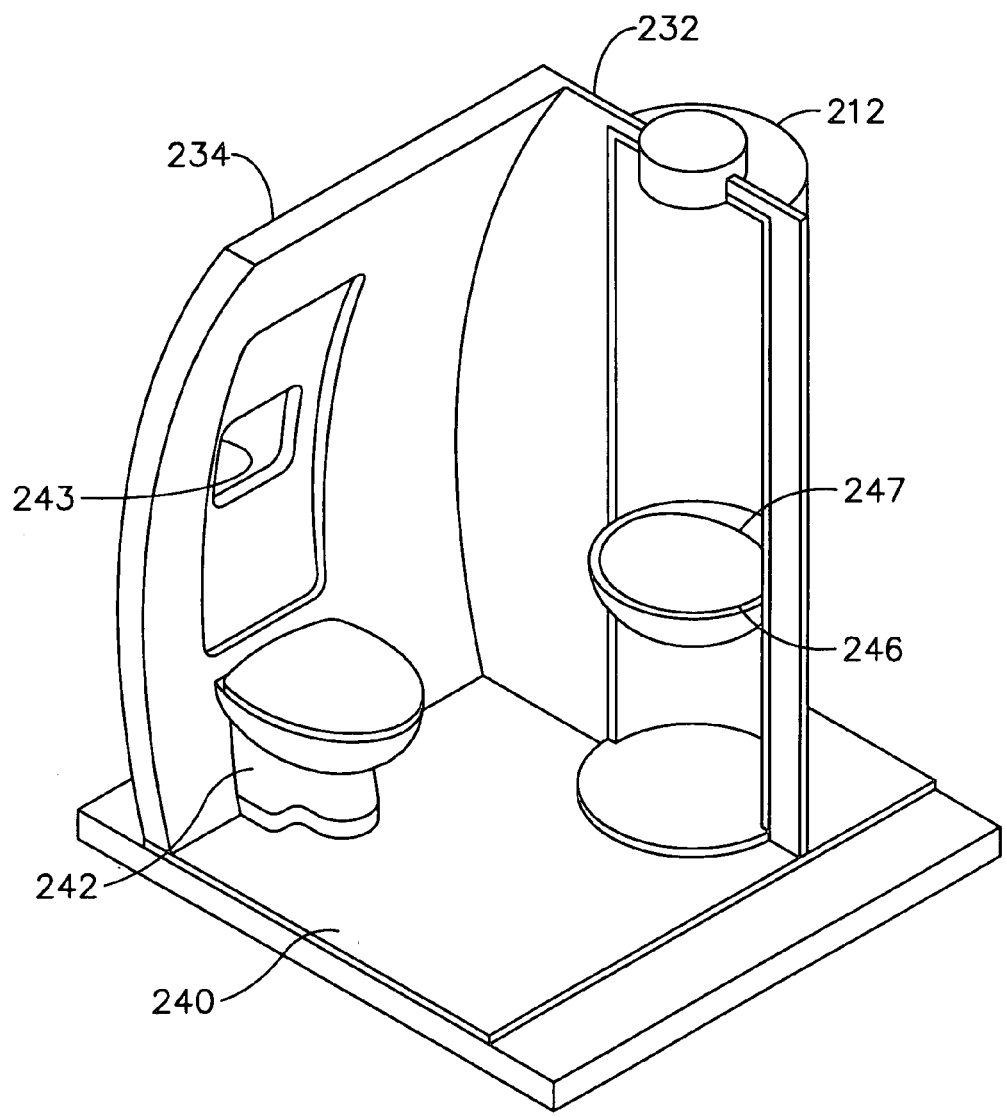
FIGS. 3A and 3B are respective inner and outer partial perspective views of the lavatory shown in FIG. 2.
Figure 6:
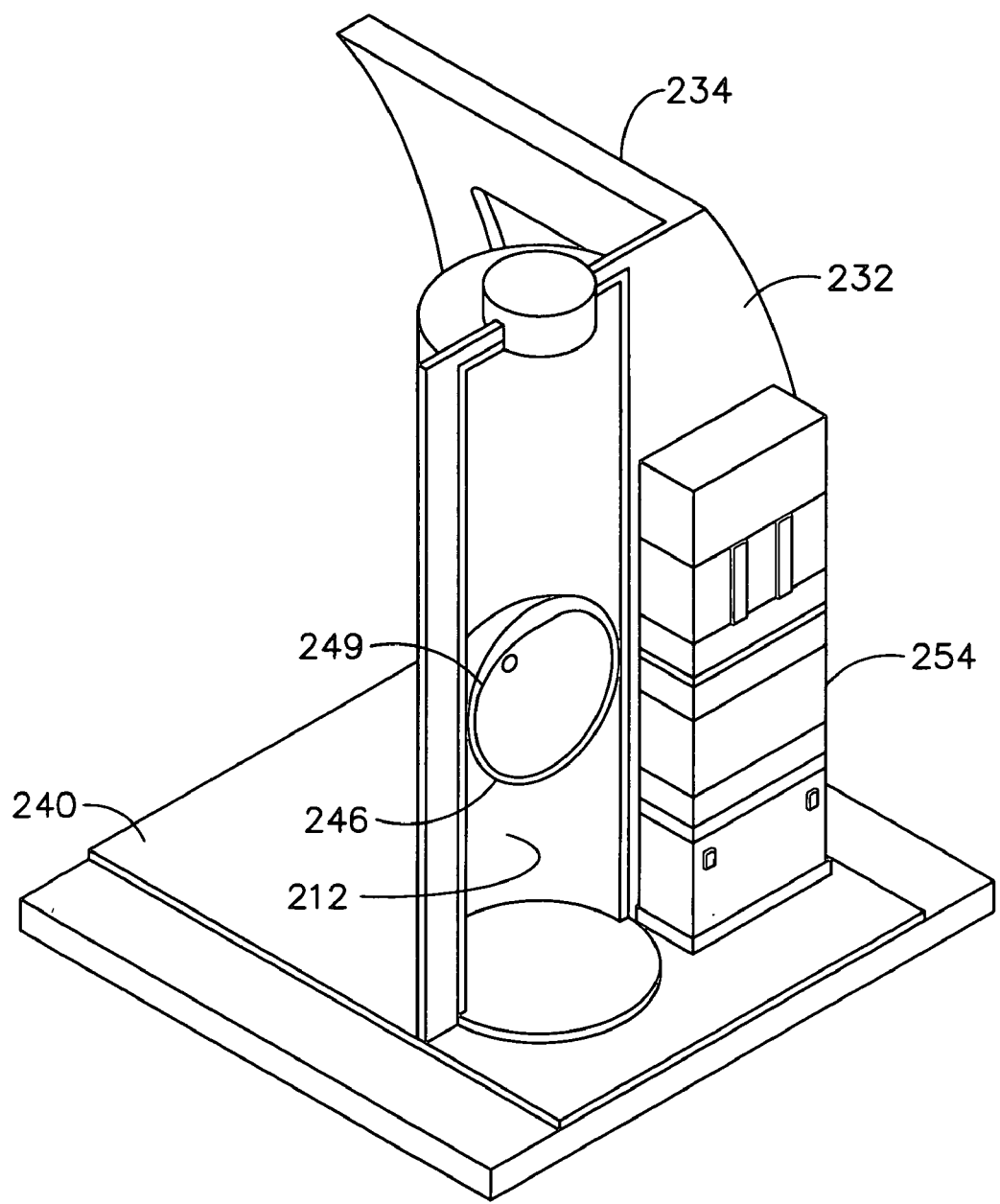
FIG. 6 is an outer partial perspective view of the lavatory shown in FIG. 5 wherein the partition is opened to expose the turntable module from the doorway area.
Figure 8:
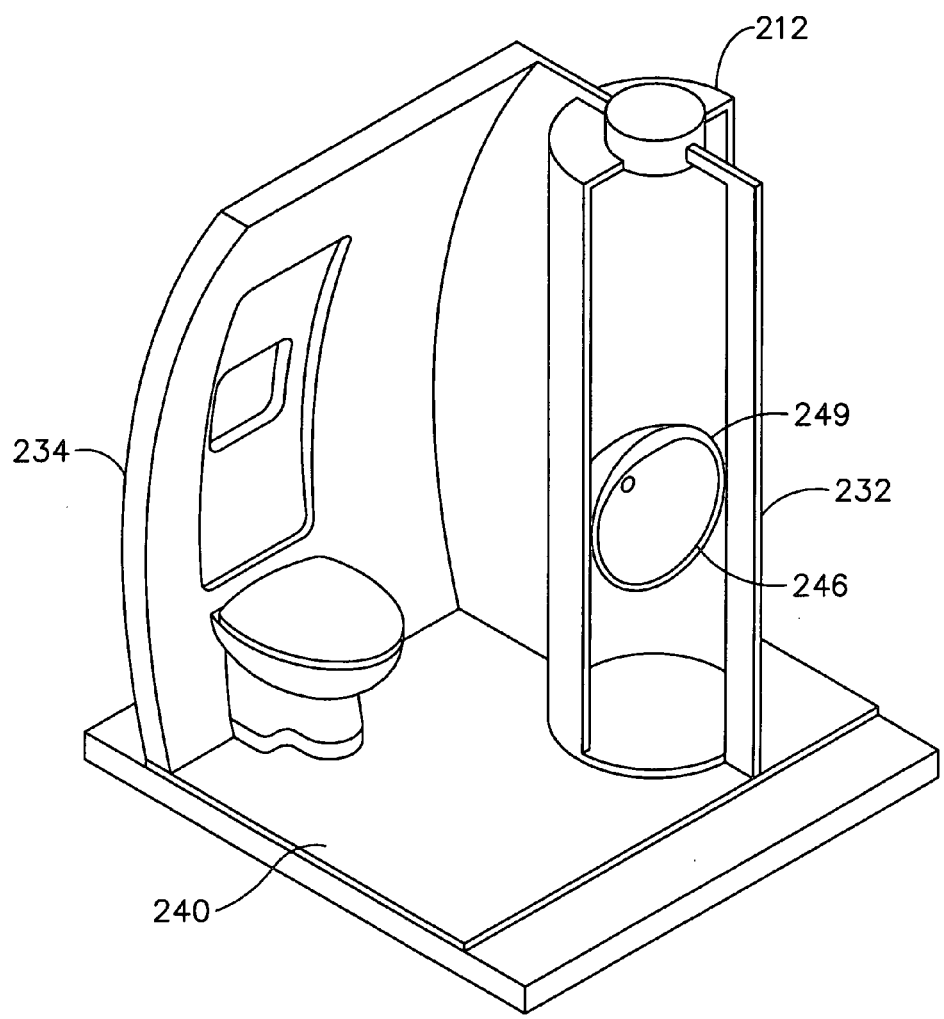
FIG. 8 is an inner perspective view of the lavatory shown in FIGS. 3 and 7 wherein the sink basin is in a stowed position and the turntable module is in an intermediate position between the "lavatory-in-use" configuration in FIG. 3 and the "lavatory-unavailable" configuration in FIG. 7.

As shown in FIGS. 3A, 6, and 8, the sink 214 includes a basin or bowl 246 hingedly coupled to the turntable module 212. This allows the basin 246 to be pivoted to a deployed position 247 for normal use (FIG. 3A) and to a stowed "flipped up" position 249 (FIGS. 6 and 8) for clearance and/or stowage. In other embodiments, the turntable module 212 can also accommodate mirrors, faucets for the sink, cabinets, water lines, drain lines, bleed lines, water heaters, waste containers, various miscellaneous plumbing fixtures, among other lavatory items.

The turntable module 212 is rotatably mounted to the fixed subassembly 230 proximate the wall 232 such that the turntable module 212 is rotatable about an generally central longitudinal axis through point 250. This mounting arrangement allows the turntable module 212 to be rotated to the "lavatory-in-use" configuration (FIGS. 2 and 3) in which the sink 214 is accessible from within the lavatory 210. The turntable module 212 can also be rotated to the "lavatory-unavailable" configuration (FIG. 7) in which the sink 214 is not accessible from within the lavatory. As shown in FIGS. 4 through 7, the turntable module 212 is positionable entirely within the lavatory footprint such that the turntable module 212 is outside of and thus not obstructing the emergency doorway area of the aircraft.

To prevent inadvertent rotation of the turntable module 212, for example, during a turbulent flight, a suitable locking mechanism (e.g., latches, etc.) can be provided. When in its locked position, the locking mechanism prevents rotation of the turntable module 212 from its present configuration, e.g., the "lavatory-in-use" or "lavatory-unavailable" configurations.

In an exemplary embodiment, cabinet magnets can be used to secure the turntable module in its present configuration, e.g., the "lavatory-in-use" or "lavatory-unavailable" configurations. The cabinet magnets can be installed on a bottom portion of the turntable striking face plates, which, in turn, can be located on an interior portion of a lavatory sidewall. Alternatively, the cabinet magnets can be replaced with electromagnets that have holding forces well in excess of hundreds of pounds. The electromagnets could be operated by a remote switch, preferably discretely located, for use by authorized personnel only.

Preferably, a partition or cover member is provided which can be used to close off the turntable module 212 during at least the taxi, takeoff, and landing phases of the aircraft. In the illustrated embodiment, the partition includes a sliding door 252 coupled to aircraft structure, although other partitions can be used including hinged doors and curtains.

Figure 4:
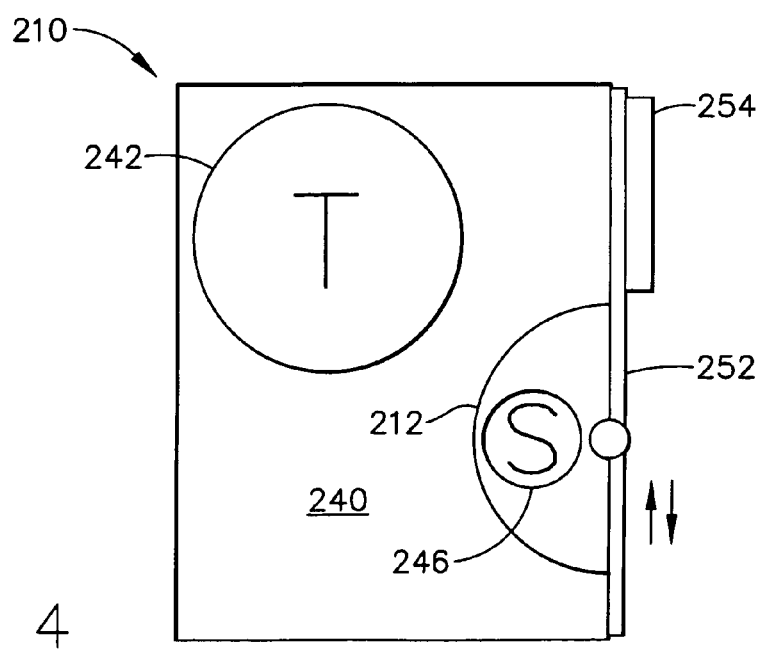
FIG. 4 is a schematic plan view of the lavatory shown in FIG. 2 wherein the turntable module is shown in a "stowed" configuration with a partition covering the turntable module for taxi, takeoff, and landing phases of the aircraft.
Figure 5:
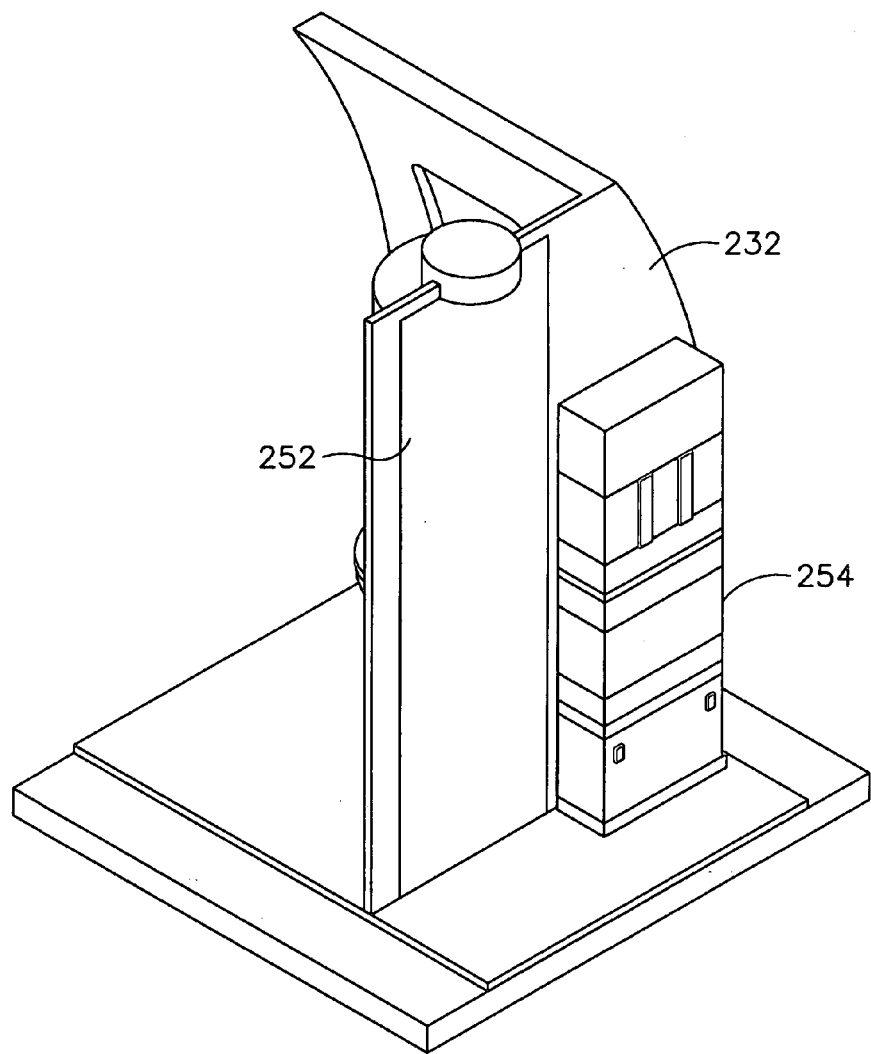
FIG. 5 is an outer partial perspective view of the lavatory shown in FIG. 4.

FIGS. 4 and 5 show the sliding door 252 in a closed position in which the door 252 covers up the interior of the turntable module 212 thereby preventing access thereto. FIG. 6 shows the sliding door 252 in an open position in which the interior of the turntable module 212 is exposed such that the sink 212 can be accessed from the doorway area. For example, the sink 214 can be used from within the doorway area as a large baby-changing area with curtains closing off the doorway area for privacy.

In the illustrated embodiment, the turntable module 212 is sized and positioned relative to the sidewall 232 such that an optional flight attendant seat 254 can be mounted to the sidewall 232 adjacent the turntable module 212.

Figure 9:
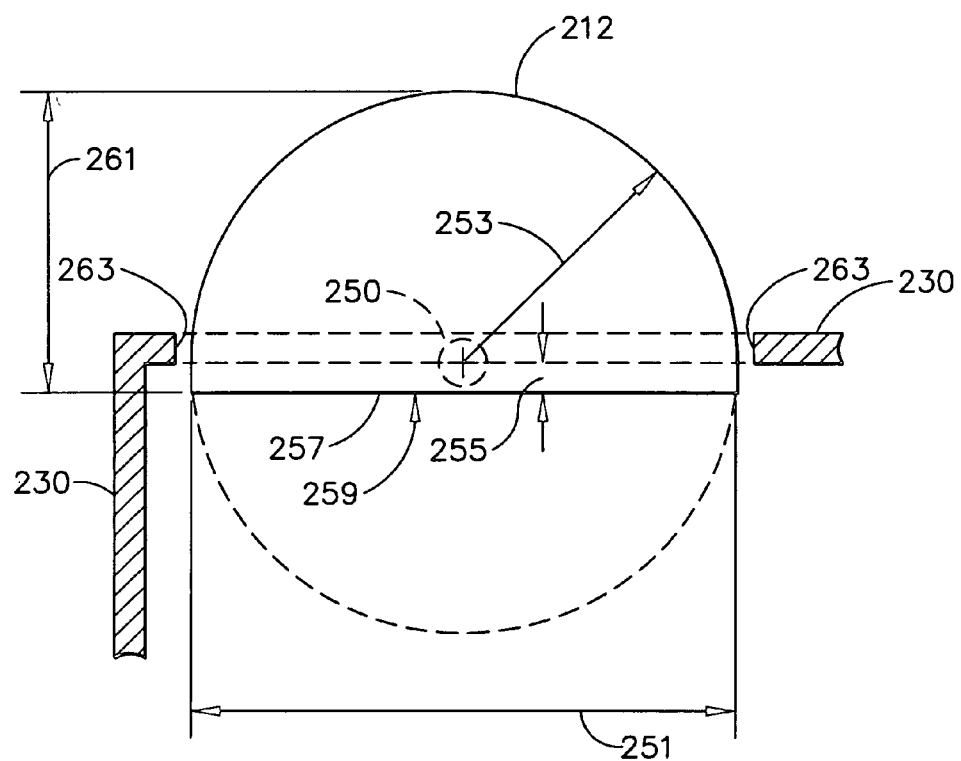
FIG. 9 is a schematic plan view of a turntable module according to one embodiment of the invention.

FIG. 9 illustrates an exemplary embodiment of the turntable module 212 in which the module 212 can be implemented in lavatory having an exterior footprint dimension of forty-one inches by thirty-eight inches (i.e., 41"× 38"). In this exemplary embodiment, the turntable module 212 has a wall thickness of about one-half inch, a width 251 of about twenty inches and a height of about seventy inches. The turntable module 212 has a semi-circular radius 253 of about twenty inches, and a distance 255 of about one and one-half inches from the pivot point 250 to the edge 257 of the opening 259 into the turntable module 212. Accordingly, the distance 261 is about eleven and one-half inches. The opening 259 is located about one inch from the interior, inboard edges 263 of the lavatory. The turntable module 212 is further located about five inches above the lavatory floor and about two inches below the lavatory ceiling.

All of these dimensions, however, are exemplary only, and the specific size and dimensions of the turntable module required will depend in large part on the specific type of aircraft or other mobile platform in which the turntable module is installed, as well as the specific configuration of the part being formed. Preferably, the dimensional size of the turntable module is optimized to provide the largest, functional turntable module within the existing parameters of the lavatory in which the turntable module is to be installed. Further, the items supported and accommodated by the turntable module and the compartment in which it will be employed will also vary depending on the requirements of the particular aircraft or other mobile platform.

In a preferred embodiment, a friction dampening device is used to dampen the speed of the revolutions of the turntable module. Alternatively, other suitable systems can also be employed to dampen the rotational speed of the turntable module, such as the systems used in commercial revolving doors which include a reservoir of oil to dampen the speed of the revolutions, along with ordinary shafts and pivots.

Figure 10:
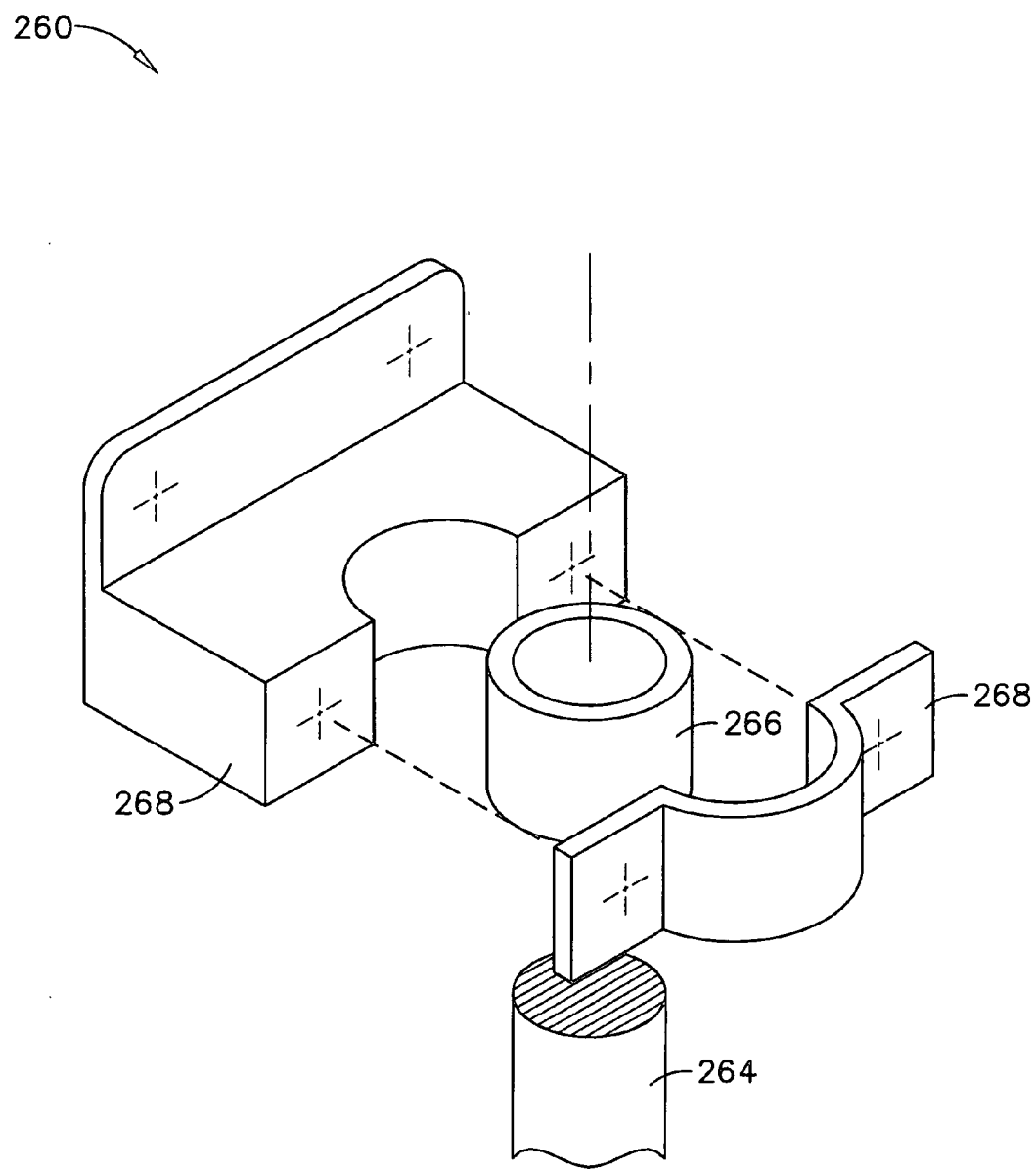
FIG. 10 is an exploded perspective view of an upper pivotal mounting arrangement for a turntable module according to one embodiment of the invention.
Figure 11:
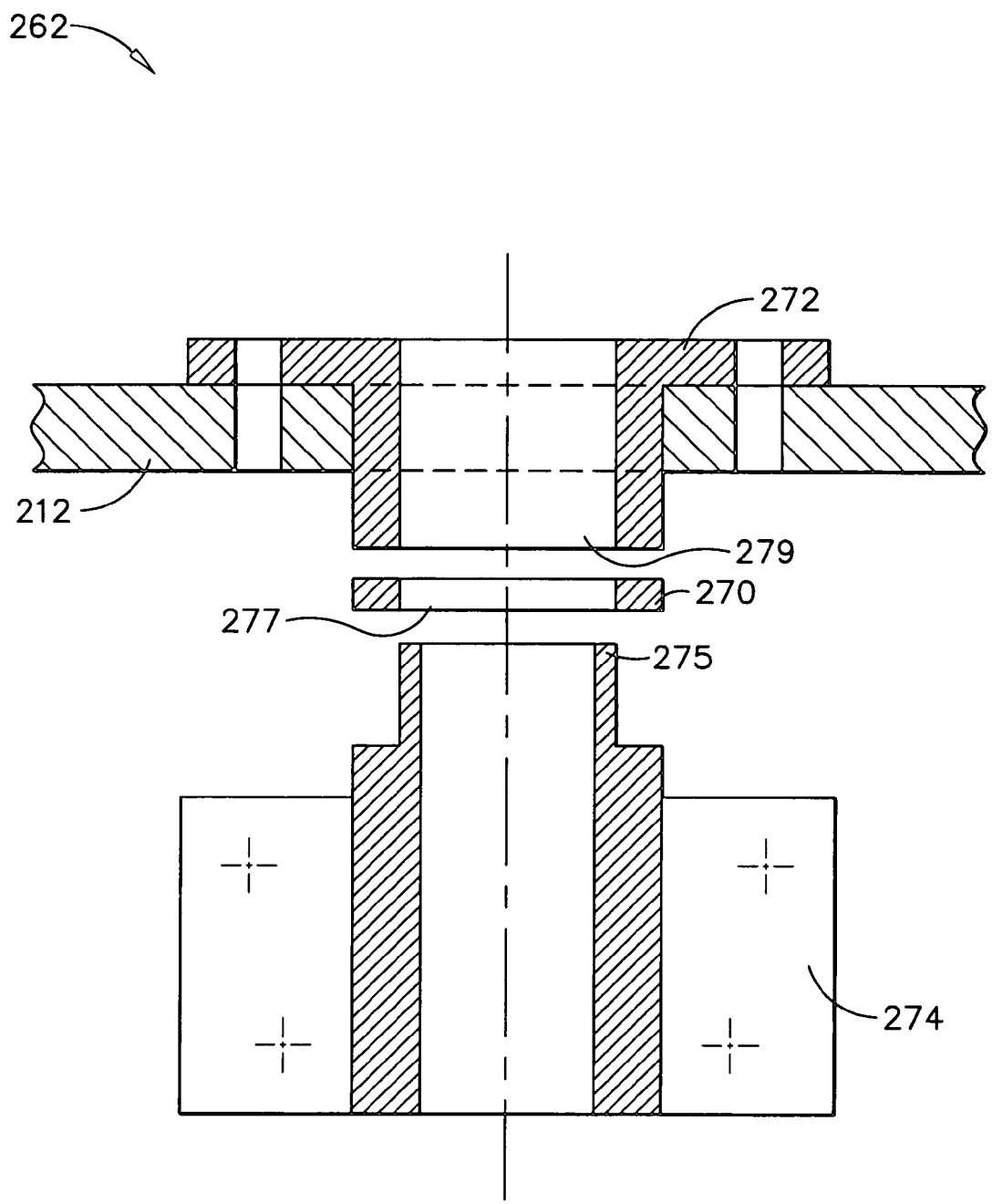
FIG. 11 is an exploded cross-sectional view of a lower pivotal mounting arrangement for a turntable module according to one embodiment of the invention.

FIGS. 10 and 11, respectively, illustrate exemplary upper and lower pivotal mounting arrangements 260 and 262 for the turntable module 212. As shown in FIG. 10, the upper pivot 260 includes a shaft 264 and a bushing 266 which control stability and firmness of the rotation. The shaft 264 protrudes from a top portion of the turntable module 212. The bushing 266 is clamped by a standoff bracket 268, which, in turn, is mounted above the turntable module 212 and covered from view with a shroud.

As shown in FIG. 11, the lower pivot 262 includes a low-friction, nylon spacer 270 sandwiched between an upper shaft 272 and a lower shaft 274. An upper portion 275 of the lower shaft 274 is positioned within the passageways 277 and 279 defined through the spacer 270 and shaft 274, respectively. The lower shaft 274 is mounted to a lavatory wall, while the upper shaft 272 supports the turntable module 212. In this exemplary manner, the spacer 270 allows the turntable module 212 and upper shaft 272 to be rotated relative to the lavatory wall and lower shaft 274 coupled thereto. The inner diameters of the shafts 272 and 274 are preferably sized to provide spacing for running plumbing lines and/or electrical wires through the center pivot point of the turntable module 212.

Figure 12:
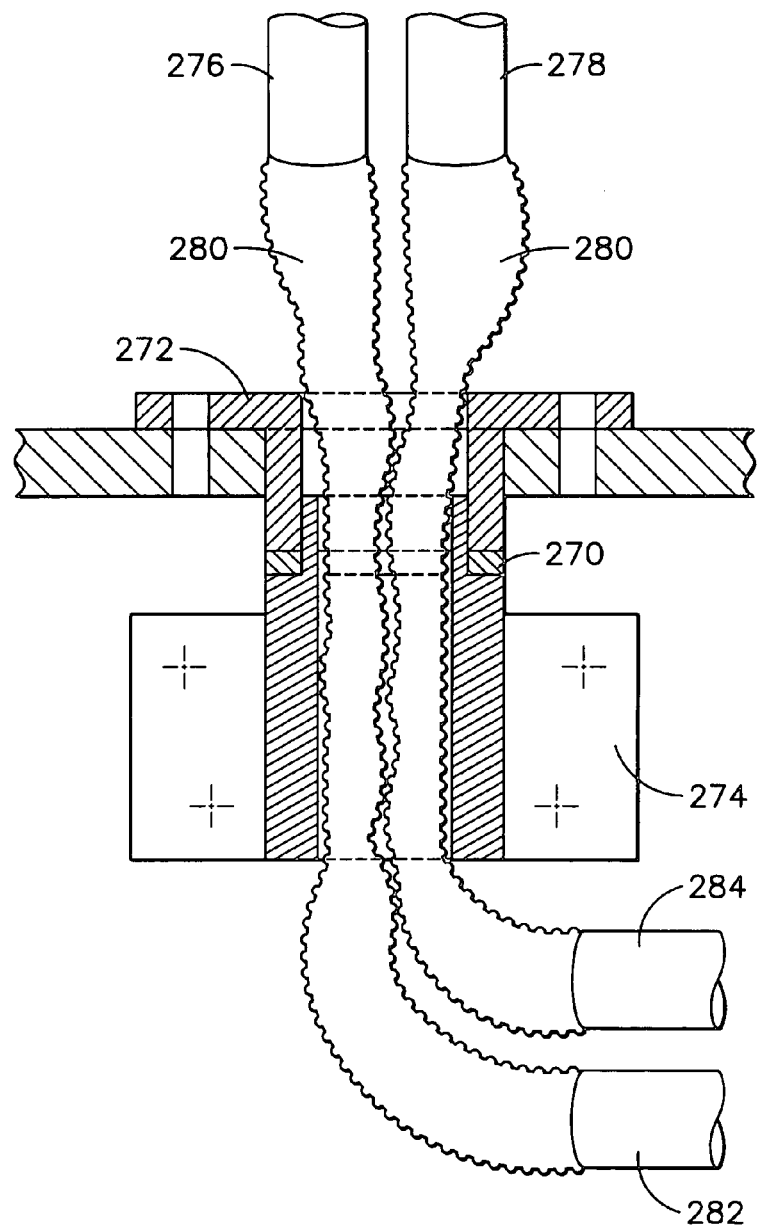
FIG. 12 is a cross-sectional view of the lower pivot shown in FIG. 11 accommodating plumbing lines according to one embodiment of the invention.

Existing outboard airplane lavatory designs typically run plumbing lines through the outboard lavatory panel adjacent to the sidewall of the airplane. Some airplane lavatories run plumbing lines through the ceiling and floor of the lavatory. Without requiring any significant changes, embodiments of the present invention can utilize the existing plumbing lines coming from the outboard panel. In the exemplary embodiment of FIG. 12, plumbing lines can be routed above the lavatory floor leading to the bottom pivot 262. As shown in FIG. 12, the plumbing lines include a water line 276 and a drain 278. Flex hoses 280 are preferably used to connect the turntable plumbing lines 276 and 278 to the respective lavatory plumbing lines 282 and 284. By routing the flex hoses 280 through the spacer 270 and shafts 272 and 274 of the bottom pivot 262, the turntable module 212 can freely rotate, preferably at least about one hundred eighty degrees, while maintaining its plumbing connection. Electrical wire bundles (not shown) can also be routed through the passageways defined by the spacer 270 and shafts 272 and 274.

In a preferred embodiment, a friction dampening device is used to dampen the speed of the revolutions of the turntable module. Alternatively, other suitable systems can also be employed to dampen the rotational speed of the turntable module, such as the systems used in commercial revolving doors which include a reservoir of oil to dampen the speed of the revolutions, along with ordinary shafts and pivots.

In some embodiments, an actuation system (not shown) may also be provided to enable automatic rotation of the turntable module so long as the actuation system does not compromise the safety and reliability of the system. The actuator system can include a motor that drives a gear coupled to the turntable module.

Closeouts can also be employed for sealing light and water from penetrating into unwanted areas.

OPERATION

In operation, the lavatory 210 and turntable module 212 can be used as follows. When the aircraft is on the ground, taxiing, during takeoff, climbout and landing, the turntable module 212 is preferably in the stowed configuration shown in FIGS. 4 and 5. This allows passengers to be loaded on the aircraft or deplaned and operations to be conducted in a routine manner while the aircraft is on the ground. Because the turntable module 212 is within the lavatory footprint when in the stowed configuration, the turntable module 212 does not obstruct or intrude into the doorway area.

Figure 2:
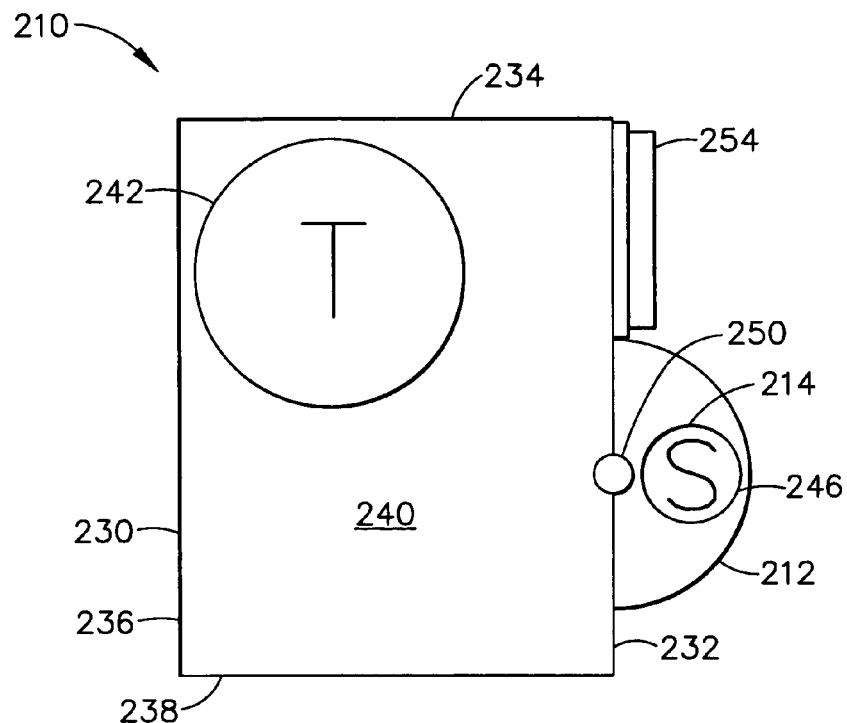
FIG. 2 is a schematic plan view of a lavatory including a turntable module shown in a "lavatory-in-use" configuration in which the sink is accessible from within the lavatory according to one embodiment of invention.
Figure 3B:
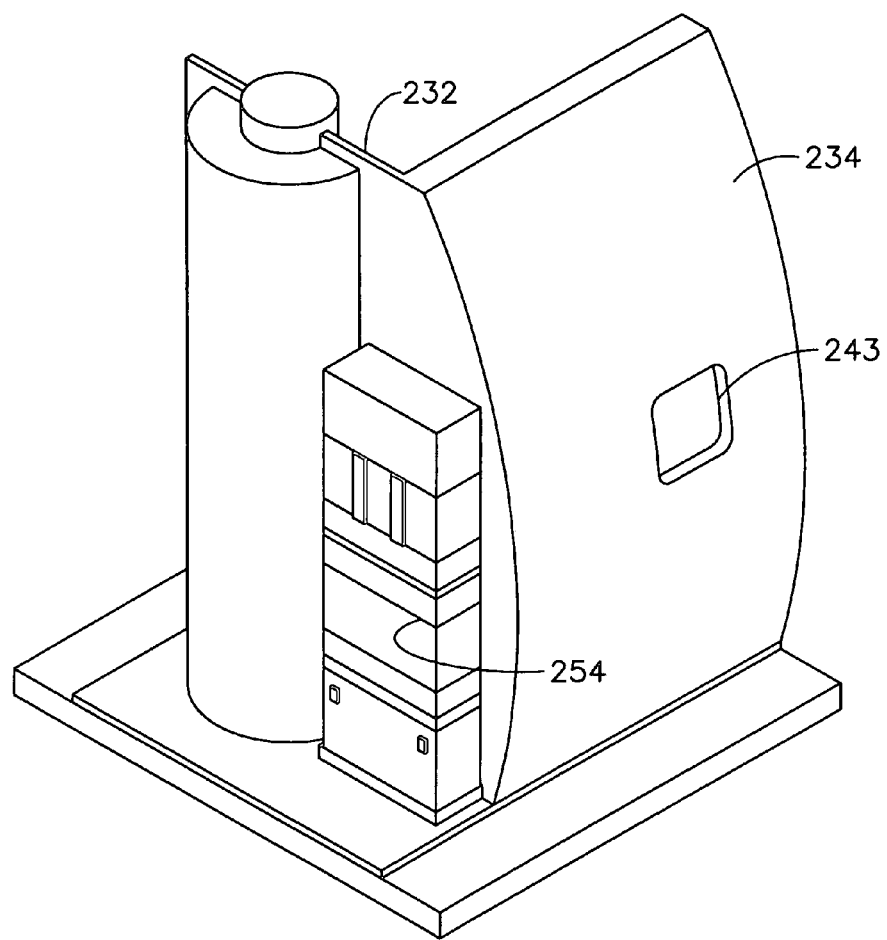

After takeoff and climbout, an attendant may then unlock the turntable module 212 and rotate the turntable module 212 into the area or space proximate the doorway, as shown in FIGS. 2 and 3. Once rotated into this "lavatory-in-use" configuration, the turntable module 212 can be relocked.

Figure 13:
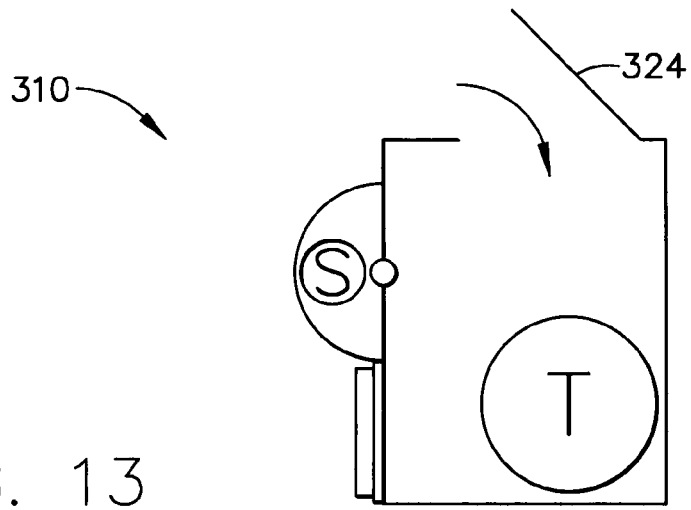
FIG. 13 is a schematic plan view of a lavatory including a turntable module and a conventional door according to one embodiment of invention.
Figure 14:
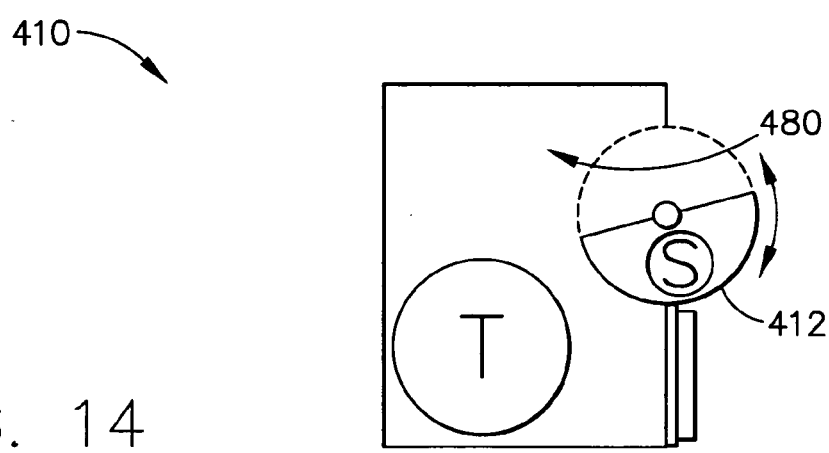
FIG. 14 is a schematic plan view of a lavatory including a turntable module shown in an intermediate position in which an entryway is defined into the lavatory according to one embodiment of invention.
Figure 15:
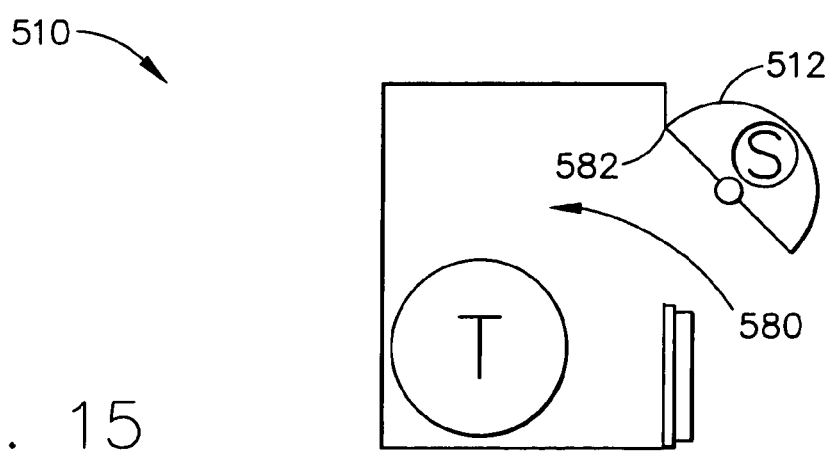
FIG. 15 is a schematic plan view of a lavatory including a turntable module shown pivoted to an open position in which an entryway is defined into the lavatory according to one embodiment of invention.

Access to the inside of the lavatory can be through a conventional door 124 (FIG. 1), 324 (FIG. 13), 624 (FIGS. 16 through 18), etc. whereby the lavatory 110, 310, 510 is available for passenger and crew use. Alternatively, or additionally, access to the inside of the lavatory 410 can be through an entryway 480 which is opened when the turntable module 412 is rotated to an intermediate position, as shown in FIG. 14. In yet other embodiments, a side portion 582 of the turntable module 512 can be hingedly coupled to aircraft structure such that turntable module 512 can be pivoted to an open position which thus opens an entryway 580 into the lavatory 510, as shown in FIG. 15.

The turntable module is preferably sized such that sufficient space remains in the area proximate the doorway for any needed egress even when the turntable module is in the "lavatory-in-use" configuration. In the event of an inflight emergency or during landing preparations, an attendant ordinarily would unlock the turntable module and rotate it back into the lavatory footprint, thereby eliminating the turntable module's protrusion into the FAA doorway clearance requirement. The turntable module can then be relocked and the sink 214 closed off by the sliding door 252 (FIG. 5).

Before rotating the turntable module 212 back into the lavatory footprint, a visual inspection of the interior of the lavatory 210 should be performed to ensure that the lavatory is unoccupied and free of blockage items. The turntable module 212 would ordinarily remain stowed during final approach and landing. After the aircraft has parked at the airport gate, crews could rotate the turntable module 212 to service the lavatory 210 and turntable module 212, as appropriate.

FIGS. 16 through 18 illustrate another exemplary embodiment of a lavatory 610 embodying at least some aspects of the invention. As shown, the lavatory 610 includes a stationary subassembly 630 and a turntable module 612.

The fixed subassembly 630 includes four sidewalls 632, 634, 636, and 638. The subassembly 630 also includes a floor pan 640 and a ceiling 641. A toilet 642 is affixed to the floor pan 640. A door 624 is also provided for accessing the interior of the lavatory 610.

The turntable module 612 is disposed adjacent the sidewalls 632 and 634 and forms a corner of the lavatory 610. The turntable module 612 supports a sink basin 646 and a mirror 647. In other embodiments, the turntable module 612 can accommodate a cabinet and/or other lavatory items and amenities.

Figure 16A:
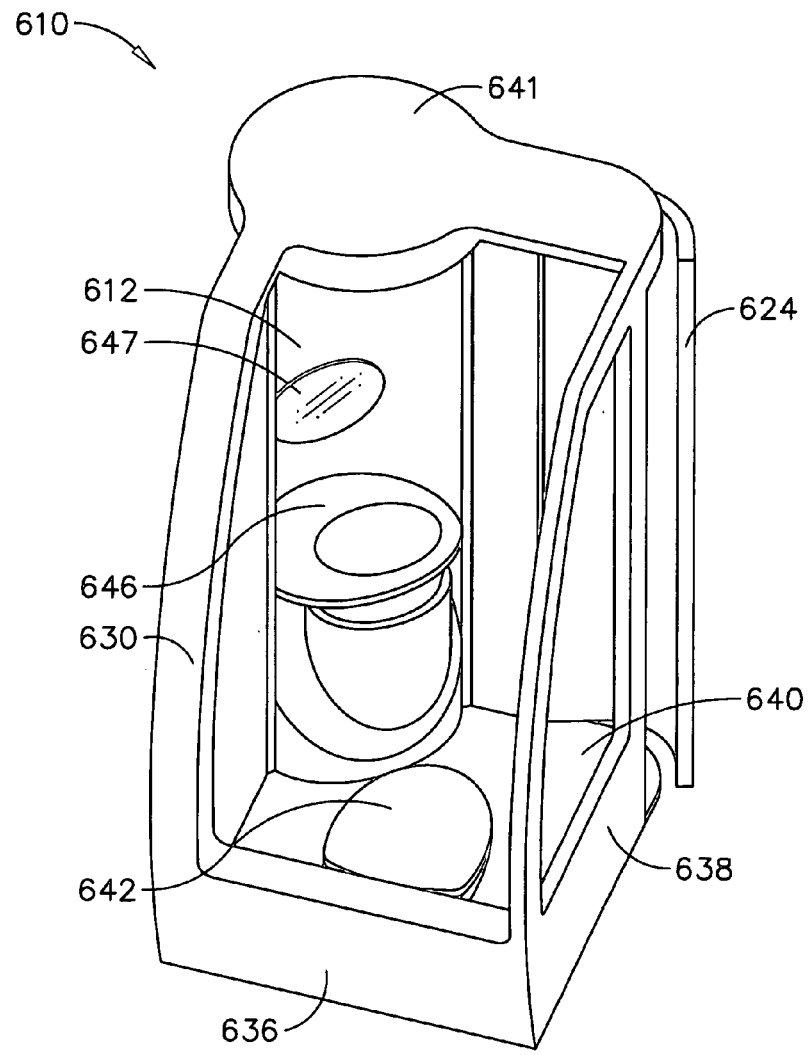
FIGS. 16A and 16B are respective inner and outer perspective views of a lavatory including a turntable module shown in a "lavatory-in-use" configuration in which the sink is accessible from within the lavatory according to one embodiment of invention.
Figure 16B:
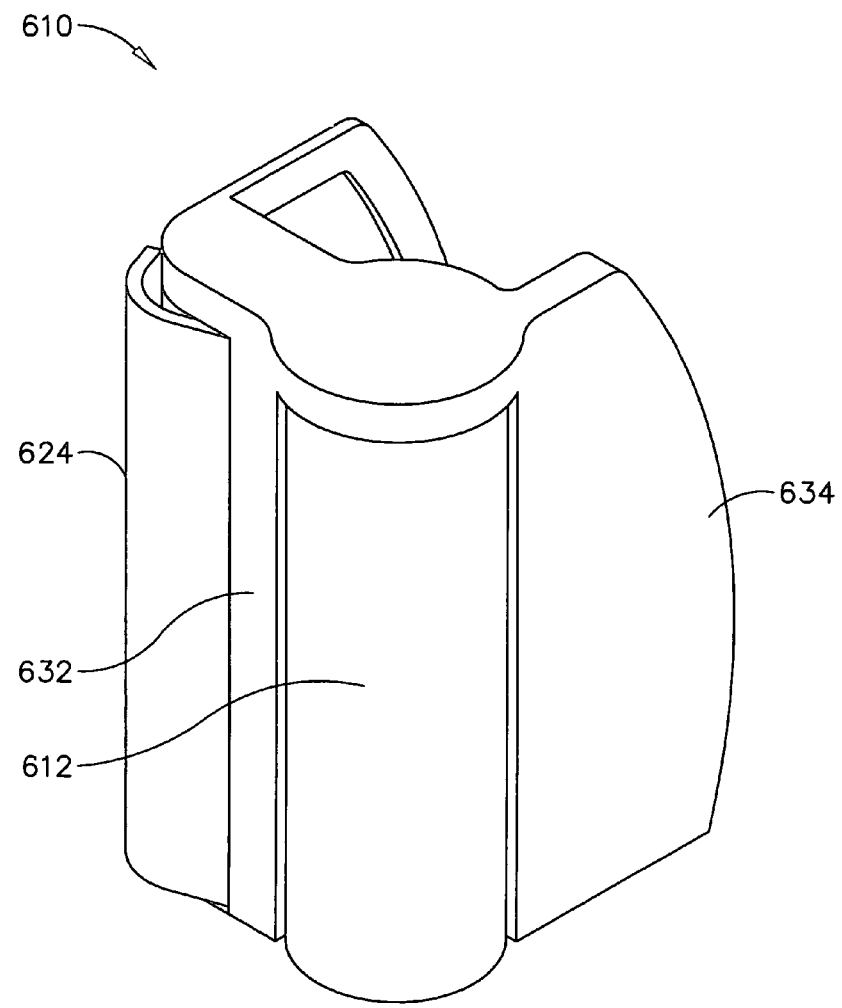

In FIGS. 16A and 16B, the turntable module 612 has been rotated to a "lavatory-in-use" configuration in which the sink basin 646 is accessible from within the lavatory 610.

Figure 17A:
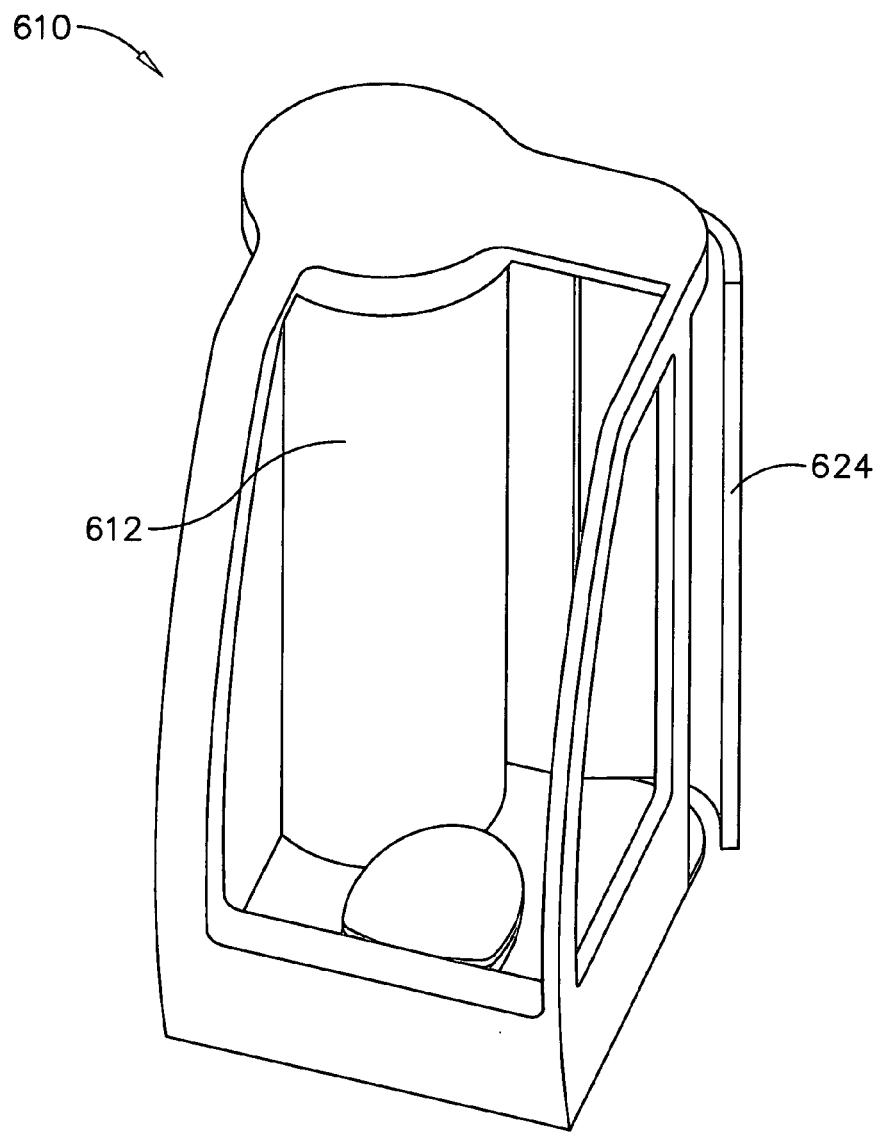
FIGS. 17A and 17B are respective inner and outer perspective views of the lavatory shown in FIG. 16 wherein the turntable module is shown in a "lavatory-unavailable" configuration in which the sink is not accessible from within the lavatory.
Figure 17B:
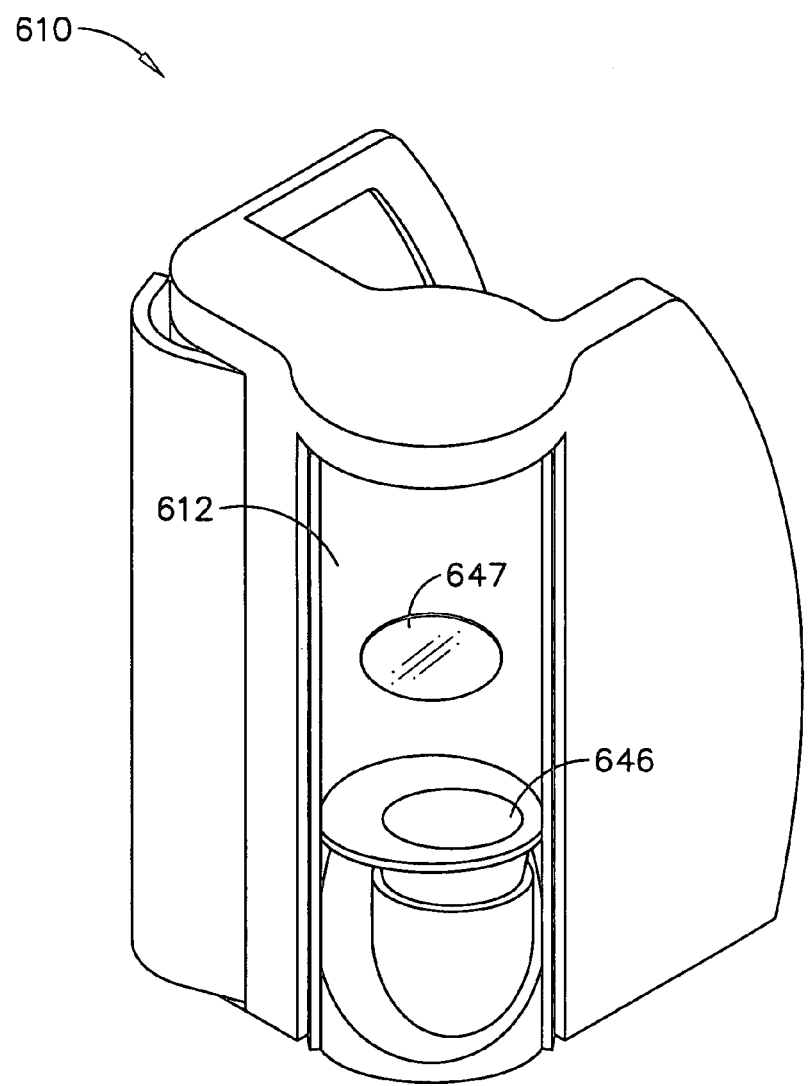

FIGS. 17A and 17B illustrate the turntable module 612 after it has been rotated to a "lavatory-unavailable" configuration in which the sink basin 646 is not accessible from within the lavatory 610. The sink basin 646, however, may be accessible from within the doorway area adjacent the lavatory 610.

Figure 18A:
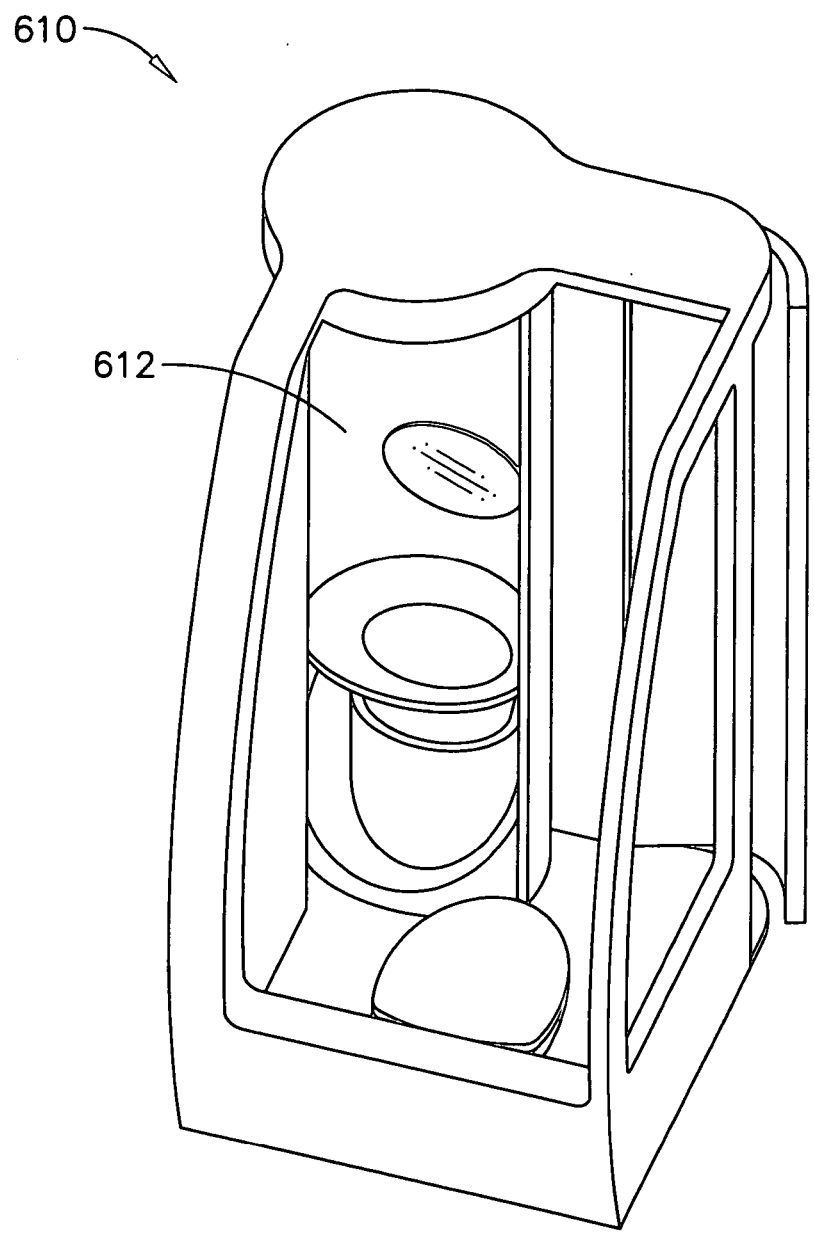
FIGS. 18A and 18B are respective inner and outer perspective views of the lavatory shown in FIG. 16 wherein the turntable module is shown rotated to an intermediate position between the "lavatory-in-use" configuration in FIG. 16 and the "lavatory-unavailable" configuration in FIG. 17.
Figure 18B:
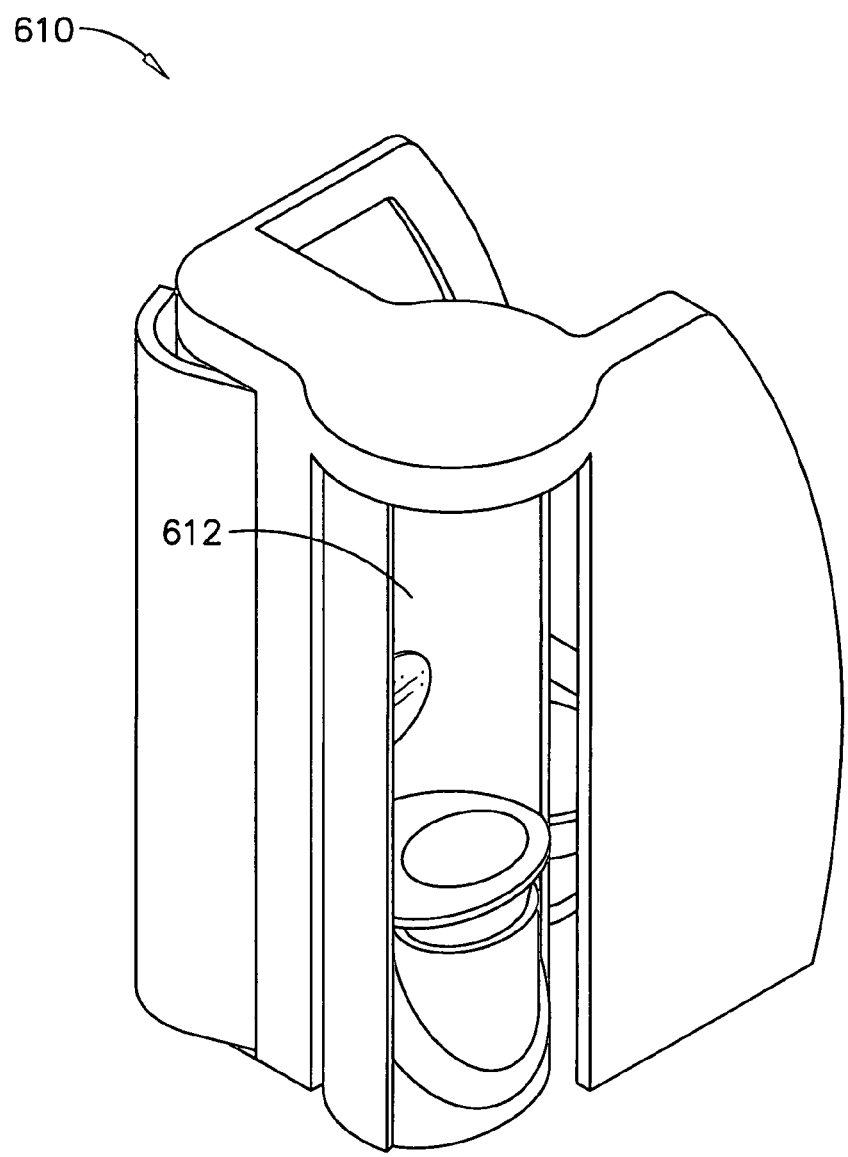

FIGS. 18A and 18B illustrate the turntable module 612 in an intermediate position between the "lavatory-in-use" configuration in FIG. 16 and the "lavatory-unavailable" configuration in FIG. 17.

Figure 19:
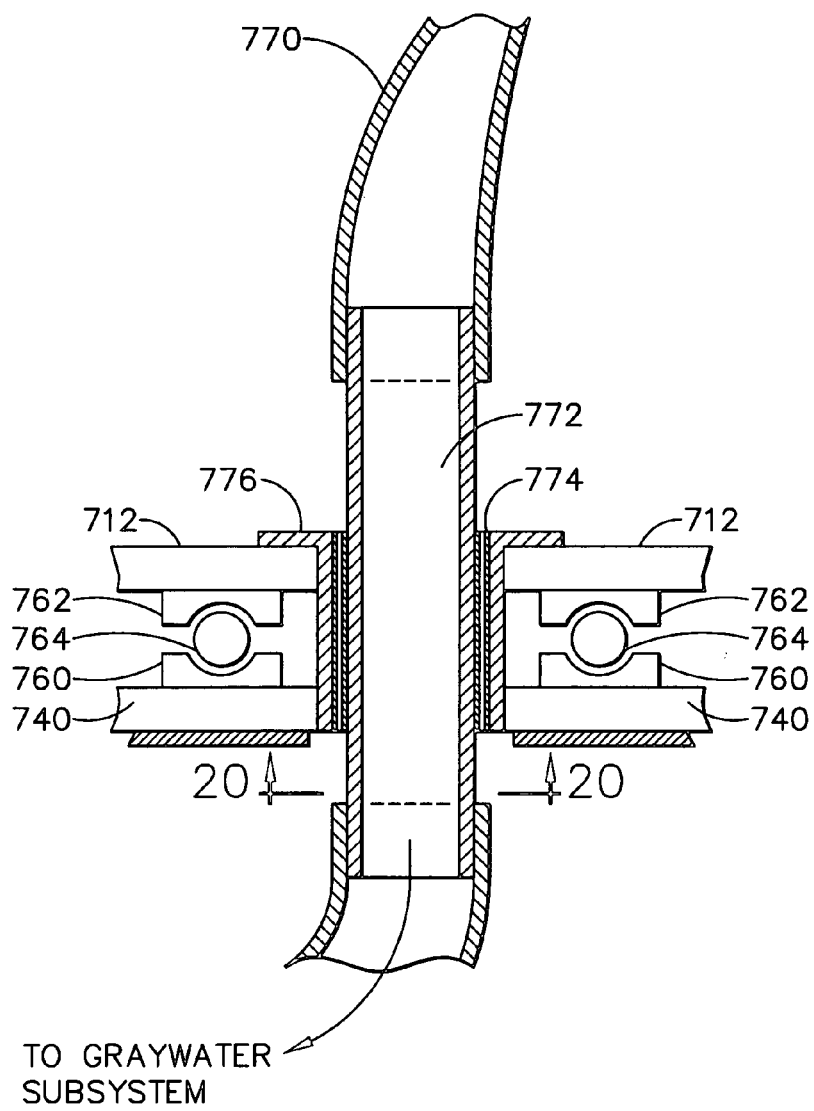
FIG. 19 is a cross-sectional side view of a system for rotatably mounting a turntable module in an mobile platform according to one embodiment of the invention.
Figure 20:
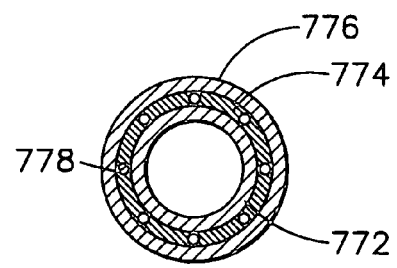
FIG. 20 is a cross-sectional view taken along the plane 20—20 in FIG. 19.

FIGS. 19 and 20 illustrate another exemplary mounting arrangement for a turntable module. As shown in FIG. 19, a lower bushing 760 is attached to the lavatory floor pan 740, and an upper bushing 762 is attached to the turntable module 712. A plurality of bearing balls 764 are situated between the lower and upper bushings 760 and 762. The bearing balls 764 provide the turntable module 712 with a rotational degree of freedom relative to the lower bushing 760 and thus the fixed floor pan 740 as well. In this exemplary manner, the turntable module 712 can be rotatably mounted to the fixed subassembly 730.

Figure 7:
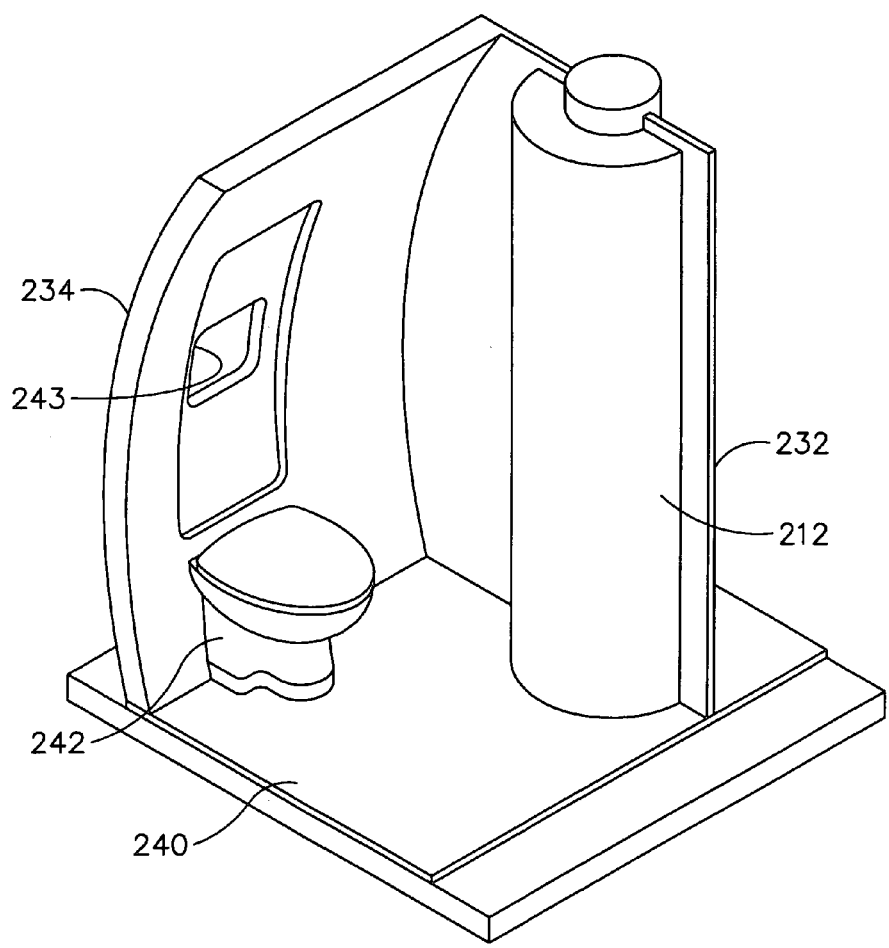
FIG. 7 is an inner perspective view of the lavatory shown in FIGS. 5 and 6 wherein the turntable module is shown in a "lavatory-unavailable" configuration in which the sink is not accessible from within the lavatory.

To allow drainage from the sink basin 746, a flexible conduit or hose 770 (e.g., a flex hose, etc.) is in communication with the drain (not shown) of the sink basin 746. The hose 770 has sufficient flexibility to accommodate rotation of the turntable module 712 between at least the "lavatory-in-use" position (FIG. 3) and the "lavatory-unavailable" position (FIG. 7).

With further reference to FIGS. 19 and 20, the hose 770 is in communication with a drain line 772. The drain line 772, in turn, is in communication with a gray water subsystem (not shown) of the aircraft.

The drain line 772 is positioned within an electrical ring connector 774, which, in turn, is positioned within a bushing 776. As shown in FIG. 20, the electrical ring connector 774 includes raceways 778 therethrough for electrical wiring.

In another form, the invention provides methods for increasing useable space within a mobile platform compartment (e.g., aircraft lavatory, etc.) adjacent a predetermined area (e.g., passenger doorway area) of the mobile platform. In one embodiment, the method generally includes rotatably coupling a turntable module to supporting structure within the mobile platform such that the turntable module is rotatable to a first angular position in which the turntable module is substantially within the compartment and outside the predetermined area and to a second angular position in which the turntable module is substantially within the predetermined area and outside the compartment; and supporting at least one item (e.g., sink, etc.) with the turntable module such that the item is accessible from within the compartment when the turntable module is in the second angular position.

In various embodiments, the mobile platform can be an aircraft and the predetermined area can be a passenger doorway area of the aircraft. In which case, the method can further include rotating the turntable module to the first angular position in which the turntable module is substantially within the compartment and outside the passenger doorway area during taxi, takeoff, and landing phases of the aircraft; and rotating the turntable module to the second angular position in which the turntable module is substantially within the passenger doorway area and outside the compartment during cruise.

By converting emergency space required by the FAA during taxi, takeoff and landing into useable space during cruise, various embodiments of the invention increase useable space within aircraft lavatories without reducing revenue generating spaces. Further, the turntable module in various embodiments includes a curved architecture that allows it to be readily retrofit into existing aircraft and/or implemented into new aircraft designs. Various embodiments also rotatably mount the turntable module to aircraft supporting structure using a ball-bearing system, which is structurally reliable even when flexion occurs in the aircraft during flight.

The invention is applicable to a wide range of mobile platforms including commercial aircraft, private aircraft, buses, ships, trains, among other mobile platforms. Accordingly, the specific references to aircraft or mobile platform herein should not be construed as limiting the scope of the present invention to a specific type of aircraft or mobile platform.

Further, the invention can also include configurations suitable for use with other compartments on a mobile platform besides lavatories. For example, a turntable module could be implemented to increase the operating space of a galley by using the turntable module for stowage for food and/or to support food service items, such as microwaves, coffee machines, appliances, etc. The galley turntable module could, for example, be rotated into a doorway entry area when the galley is being occupied by attendants, therefore increasing space within the galley.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An apparatus for increasing useable space within an aircraft lavatory adjacent a passenger doorway area of the aircraft, the apparatus comprising:
    a turntable module rotatably coupled to supporting structure of the aircraft such that the turntable module is rotatable about a generally central longitudinal axis to a first angular position in which the turntable module is substantially within the lavatory and outside the passenger doorway area and to a second angular position in which the turntable module is substantially within the passenger doorway area and outside the lavatory; and
    a sink supported by the turntable module such that the sink is accessible from within the lavatory when the turntable module is in the second angular position.

2. The apparatus of claim 1, further comprising:
    a first shaft coupled to the turntable module for common rotation;
    a second shaft coupled to supporting structure of the aircraft; and
    a spacer positioned generally between the first and second shafts to allow rotation of the first shaft and turntable module relative to the second shaft.

3. The apparatus of claim 2, wherein:
    the first shaft defines a passage therethrough; and
    the apparatus further comprises at least one flexible plumbing line routed through the first shaft passage and in communication with the sink.

4. The apparatus of claim 3, wherein:
    the second shaft defines a passage therethrough;
    the spacer defines a passage therethrough; and
    the at least one flexible plumbing line comprises a first flexible plumbing line routed through each said passage for communicating a fluid to the sink, and a second flexible plumbing line routed through each said passage for communicating drainage from the sink.

5. The apparatus of claim 1, wherein the sink is supported by the turntable module such that the sink is accessible from within the passenger doorway area when the turntable module is in the angular position in which the turntable module is substantially within the lavatory and outside the passenger doorway area.

6. The apparatus of claim 1, wherein the turntable module is rotatable to an intermediate angular position in which an entryway is defined into the compartment.

7. The apparatus of claim 1, wherein a side portion of the turntable module is pivotably coupled to supporting structure of the aircraft such the turntable module is pivotable to an open position in which an entryway is defined into the compartment and to a closed position in which the entryway is closed.

8. The apparatus of claim 1, wherein the turntable module comprises a generally semi-circular cylinder rotatably mounted to a stationary portion of the compartment.

9. An aircraft comprising the apparatus of claim 1.

10. An apparatus for increasing useable space within an aircraft lavatory adjacent a passenger doorway area of the aircraft, the apparatus comprising:
    a turntable module rotatable coupled to supporting structure of the aircraft such that the turntable module is rotatable to a first angular position in which the turntable module is substantially within the lavatory and outside the passenger doorway area and to a second angular position in which the turntable module is substantially within the passenger doorway area and outside the lavatory; and
    a sink supported by the turntable module such that the sink is accessible from within the lavatory when the turntable module is in the second angular position, wherein the sink includes a basin pivotably coupled to the turntable module such that the basin is pivotable to a deployed position and to a stowed position.

11. An apparatus for increasing useable space within a mobile platform compartment adjacent a predetermined area of the mobile platform, the apparatus comprising:
    a turntable module rotatably coupled to supporting structure of the mobile platform such that the turntable module is rotatable about a generally central longitudinal axis relative to the supporting structure;
    the turntable module being rotatable to a first angular position in which the turntable module is substantially within the compartment and outside the predetermined area;
    the turntable module being rotatable to a second angular position in which the turntable module is substantially within the predetermined area and outside the compartment; and
    the turntable module supporting at least one item such that the item is accessible from within the compartment when the turntable module is in the second angular position.

12. The apparatus of claim 11, further comprising:
    a first shaft coupled to the turntable module for common rotation;
    a second shaft coupled to supporting structure of the mobile platform; and
    a spacer positioned generally between the first and second shafts to allow rotation of the first shaft and turntable module relative to the second shaft.

13. The apparatus of claim 11, wherein the turntable module supports a sink and accommodates at least a portion of a plumbing system in communication with the sink.

14. The apparatus of claim 13, further comprising:
    a first shaft coupled to the turntable module for common rotation, the first shaft defining a passage therethrough;
    a second shaft coupled to supporting structure of the mobile platform;
    a spacer positioned generally between the first and second shafts to allow rotation of the first shaft and turntable module relative to the second shaft; and
    at least one flexible plumbing line in communication with the sink and routed through the first shaft passage.

15. The apparatus of claim 14, wherein:
    the second shaft defines a passage therethrough;
    the spacer defines a passage therethrough; and the at least one flexible plumbing line comprises a first flexible plumbing line routed through each said passage for communicating a fluid to the sink, and a second flexible plumbing line routed through each said passage for communicating drainage from the sink.

16. The apparatus of claim 13, wherein the apparatus comprises an aircraft lavatory adjacent a passenger doorway area.

17. The apparatus of claim 11, wherein the turntable module is rotatable to an intermediate angular position in between said first and second angular positions wherein an entryway is defined into the compartment.

18. The apparatus of claim 11, wherein a side portion of the turntable module is pivotably coupled to supporting structure within the mobile platform such the turntable module is pivotable to an open position in which an entryway is defined into the compartment and to a closed position in which the entryway is closed.

19. The apparatus of claim 11, wherein the item is accessible from within the predetermined area when the turntable module is in the second angular position.

20. The apparatus of claim 11, wherein the turntable module comprises a generally semi-circular cylinder rotatably mounted to a stationary portion of the compartment.

21. An aircraft comprising the apparatus of claim 11.

22. An apparatus for increasing useable space within a mobile platform compartment adjacent a predetermined area of the mobile platform, the apparatus comprising:
  a turntable module rotatable coupled to supporting structure of the mobile platform such that the turntable module is rotatable relative to the supporting structure:
  the turntable module being rotatable to a first angular position in which the turntable module is substantially within the compartment and outside the predetermined area:
  the turntable module being rotatable to a second angular position in which the turntable module is substantially within the predetermined area and outside the compartment; and
  the turntable module supports a sink and accommodates at least a portion of a plumbing system in communication with the sink, such that the sink is accessible from within the compartment when the turntable module is in the second angular position, wherein the sink includes a basin pivotably coupled to the turntable module such that the basin is pivotable to a deployed position and to a stowed position.

23. A method for increasing useable space within a mobile platform compartment adjacent a predetermined area of the mobile platform, the method comprising:
  rotatably coupling a turntable module to supporting structure of the mobile platform such that the turntable module is rotatable about a generally central longitudinal axis to a first angular position in which the turntable module is substantially within the compartment and outside the predetermined area and to a second angular position in which the turntable module is substantially within the predetermined area and outside the compartment; and
  supporting at least one item with the turntable module such that the item is accessible from within the compartment when the turntable module is in the second angular position.

24. The method of claim 23, wherein the mobile platform comprises an aircraft, wherein the predetermined area comprises a passenger doorway area of the aircraft, and wherein the method further comprises:
  rotating the turntable module to the first angular position during taxi, takeoff, and landing; and
  rotating the turntable module to the second angular position during cruise.

25. The method of claim 23, wherein supporting at least one item with the turntable module comprises using the turntable module to support a sink and at least a portion of a plumbing system in communication with the sink.

26. The method of claim 23, wherein supporting at least one item with the turntable module comprises supporting the item with the turntable module such that the item is accessible from within the predetermined area when the turntable module is in the first angular position.

27. A method for increasing useable space within a mobile platform compartment adjacent a predetermined area of the mobile platform, the method comprising:
  rotatable coupling a turntable module to supporting structure of the mobile platform such that the turntable module is rotatable to a first angular position in which the turntable module is substantially within the compartment and outside the predetermined area and to a second angular position in which the turntable module is substantially within the predetermined area and outside the compartment; and
  using the turntable module to support a sink and at least a portion of a plumbing system in communication with the sink such that the sink is accessible from within the compartment when the turntable module is in the second angular position, wherein using the turntable module to support a sink comprises pivotably coupling a basin of the sink to the turntable module such that the basin is pivotable to a deployed position and to a stowed position.

* * * * *